US010966423B2

(12) United States Patent
Sliekers et al.

(10) Patent No.: US 10,966,423 B2
(45) Date of Patent: Apr. 6, 2021

(54) ANTI-MICROBIAL AGENT COMPRISING XANTHOHUMOL AND THE USE THEREOF IN FOOD PRODUCTS

(71) Applicant: Purac Biochem B.V., Gorinchem (NL)

(72) Inventors: Arne Olav Sliekers, Breda (NL); Kyle Robert Brookmeyer, Gorinchem (NL); Catherine Jo Anne-Sophie Verlinde, Gorinchem (NL)

(73) Assignee: PURAC BIOCHEM B.V., Gorinchem (NL)

( * ) Notice: Subject to any disclaimer, the term of this patent is extended or adjusted under 35 U.S.C. 154(b) by 235 days.

(21) Appl. No.: 15/773,069

(22) PCT Filed: Nov. 3, 2016

(86) PCT No.: PCT/NL2016/050762
§ 371 (c)(1),
(2) Date: May 2, 2018

(87) PCT Pub. No.: WO2017/078521
PCT Pub. Date: May 11, 2017

(65) Prior Publication Data
US 2018/0317480 A1 Nov. 8, 2018

(30) Foreign Application Priority Data

Nov. 3, 2015 (EP) .................... 15192725

(51) Int. Cl.
*A01N 35/04* (2006.01)
*A01N 65/08* (2009.01)
(Continued)

(52) U.S. Cl.
CPC .............. *A01N 35/04* (2013.01); *A01N 63/10* (2020.01); *A01N 65/08* (2013.01); *A23B 4/22* (2013.01);
(Continued)

(58) Field of Classification Search
CPC .......... A01N 35/04; A01N 65/08; A23B 4/22; A23L 3/34635; A23L 3/3562; C12H 1/14
(Continued)

(56) References Cited

U.S. PATENT DOCUMENTS

2006/0147558 A1* 6/2006 Ohnogi et al.
2007/0254063 A1 11/2007 Aerts et al.
(Continued)

FOREIGN PATENT DOCUMENTS

DE 19939350 A1 2/2001
DE 10 2006 018 988 B3 8/2007
(Continued)

OTHER PUBLICATIONS

"1591: 6-Prenylnaringenin" In: "Phytochemical Dictionary—A Handbook of Bioactive Compounds from Plants, Second Edition", Jan. 1999, p. 423.
(Continued)

*Primary Examiner* — Helen F Heggestad
(74) *Attorney, Agent, or Firm* — Foley & Lardner LLP

(57) ABSTRACT

The present invention concerns the field of food preservation and more specifically compositions comprising xanthohumol for use as an anti-microbial agent in the preservation of food in combination with another antimicrobial agent. In particular, the present invention provides the use of compositions comprising xanthohumol and a further antimicrobial agent, as an anti-microbial composition against lactic acid bacteria. Such compositions and food products comprising such compositions are also encompassed by the invention.

19 Claims, 5 Drawing Sheets

(51) Int. Cl.
  *A23L 3/3499* (2006.01)
  *C12H 1/14* (2006.01)
  *A23B 4/22* (2006.01)
  *A23L 3/3463* (2006.01)
  *A23L 3/3562* (2006.01)
  *A01N 63/10* (2020.01)

(52) U.S. Cl.
  CPC ......... *A23L 3/3499* (2013.01); *A23L 3/34635* (2013.01); *A23L 3/3562* (2013.01); *C12H 1/14* (2013.01); *A23V 2002/00* (2013.01)

(58) Field of Classification Search
  USPC ............................... 426/335, 532, 49, 53, 54
  See application file for complete search history.

(56) References Cited

U.S. PATENT DOCUMENTS

2015/0313852 A1* 11/2015 Garden et al.
2016/0081354 A1* 3/2016 Consalo et al.

FOREIGN PATENT DOCUMENTS

EP 1 424 385 A1 6/2004
WO WO-03/014287 A1 2/2003

OTHER PUBLICATIONS

"Connaissez-vous la boisson houblonnee benefique pour la sante?" Jun. 2014, retrieved from the Internet: URL:http://www.biere-shop.com/connaissez-vous-la-boisson-houblonnee-benefique-pour-la-sante/913, 2 pages.

"Xantho-flav extract on diatomaceous Earth", Jan. 2010, Retrieved from the Internet: URL:http://hopsteiner.com/wp-content/uploads/2014/03/XanthoFlavExtractDE_el.pdf.

"Xantho-Flav", May 2009, retrieved from the Internet: URL:https://hopsteiner.de/fileadmin/redakteur/pdf/hopfenprodukte/brauereien-produkte/26_05_xanthoflav.pdf.

Donner "desunderes bier dank neuer brautechnik: Inhaltsstoff kann krebsentstehung im labor bremsen", Bild der Wissenschaft, Oct. 2004, retrieved from the Internet: URL:http://www.wissenschaft.de/home/-/journal_content/56/12054/60718/, 1 page.

Kramer et al., "Antimicrobial activity of hop extracts against foodborne pathogens for meat applications", Journal of Applied Microbiology, 2015, vol. 118, No. 3, pp. 648-657.

Mizobuchi et al., "A new flavanone with antifungal activity isolated from hops", Agricultural and Biological Chemistry, 1984, vol. 48, No. 11, pp. 2771-2775.

Mizobuchi et al., "Antifungal activities of hop bitter resins and related compounds", Agricultural and Biological Chemistry, 1985, vol. 49, No. 2, pp. 399-403.

Natarajan et al., "Positive antibacterial co-action between hop (*Humulus lupulus*) constituents and selected antibiotics", Phytomedicine, 2008, vol. 15, pp. 194-201.

Roj et al., "Supercritical carbon dioxide hops extracts with antimicrobial properties", Open Chemistry, 2015, vol. 13, No. 1, pp. 1157-1171.

Rozalski et al., "Antiadherent and antibiofilm activity of *Humulus lupulus* L. derived products: New pharmacological properties", Biomed Research International, 2013, vol. 65, No. 1, 7 pages.

Sakamoto et al., "Beer spoilage bacteria and hop resistance", International Journal of Food Microbiology, 2003, vol. 89, pp. 105-124.

Schurr, "Dissection of the molecular mechanism of hop inhibition in Lactobacillus brevis", Dissertation, Oct. 23, 2014, retrieved from the Internet: URL:https://mediatum.ub.tum.de/doc/1226394/1226394.pdf, 179 pages.

Simpson et al., "Factors affecting antibacterial activity of hop compounds and their derivatives", Journal of Applied Bacteriology, 1992, vol. 72, pp. 327-334.

Stevens et al., "Fate of xanthohumol and related prenylflavonoids from hops to beer", Journal of Agricultural and Food Chemistry, 1999, vol. 47, No. 6, pp. 2421-2428.

International Search Report issued in International Patent Application No. PCT/NL2016/050762, dated Jan. 19, 2017.

* cited by examiner

ANTI-MICROBIAL AGENT COMPRISING XANTHOHUMOL AND THE USE THEREOF IN FOOD PRODUCTS

CROSS-REFERENCE TO RELATED APPLICATIONS

This application is the National Phase of International Patent Application No. PCT/NL2016/050762, filed Nov. 3, 2016, published on May 11, 2017 as WO 2014/078521 A1, which claims priority to European Patent Application No. 15192725.8, filed Nov. 3, 2015. The contents of these applications are herein incorporated by reference in their entirety.

TECHNICAL FIELD OF THE INVENTION

The present invention relates to the use of a composition comprising xanthohumol and a second or further microbial agent as an antimicrobial composition against lactic acid bacteria and/or molds. The present invention further relates to said composition as such and to its use in food products as an antimicrobial composition against lactic acid bacteria and/or molds. The present invention further relates to food products comprising said antimicrobial composition.

BACKGROUND OF THE INVENTION

Food products and beverages are vulnerable to growth of spoilage micro-organisms, which most often limits the shelf-life of these products and poses a threat for health issues to consumers. Indeed microbial food spoilage, and thus consumer safety, is a major concern in the food industry with regard to e.g. processing and storing of fresh meat, poultry, fish, processed meat, cooked meat, cured meat, cured fish, bakery products, cakes, ready-to-eat meals, (cooking) sauces, deli salads, pastry, preprocessed food or liquid food. Microbial growth shortens shelf-life of these products, and preventing contamination and spoilage is a highly demanding task during production, storage and distribution of said products.

In meat and prepared foods one of the type of spoilage bacteria which causes concern are lactic acid bacteria (*Lactobacillales*, LAB), i.e. members of the *Lactobacillus* family of bacteria. Modern food production processes nowadays include modified-atmosphere packaging using increased carbon dioxide levels to inhibit growth of micro-organisms. Unfortunately, lactic acid bacteria are not susceptible to carbon dioxide. Furthermore, members of the order of the *lactobacillales*, such as *Lactobacillus oligofermentans* and *Leuconostoc gasicomitatum*, are cold-tolerant lactic acid bacteria. This severely limits the usefulness of for example cold-chain storage of fresh products such as meat.

Another class of micro-organisms that often causes food spoilage are molds. Although some molds are an essential part of certain food products, the growth of molds often results in strong off-flavors and a deterioration of the appearance of a food product, rendering it unsuitable for human consumption. Moreover, some molds have the ability to produce toxic metabolites, known as mycotoxins, which are associated with a wide range of human diseases, from gastroenteric conditions to cancer.

In attempts to adequately prevent food from spoilage, various methods and (artificial) preservatives are used in food industry to prevent microbial contamination or to inhibit the microbial growth. However, these preservatives are often synthetic in nature, e.g. nitrites, benzoates, potassium sorbate, etc. Moreover, off-flavor that several preservatives can impart to the food products and the health concerns accompanied by the use of these compounds in food largely decreases their usefulness. Consumers are also becoming increasingly critical towards the source of preservatives and are less willing to consume food products wherein non-natural preservatives have been used.

Hence, a need remains for antimicrobial agents, which are efficient in preventing or inhibiting the growth of lactic acid bacteria and molds, which impart less or no off-flavor and which antimicrobial agents have been derived from natural sources.

SUMMARY OF THE INVENTION

A first aspect of the present invention relates to the use of a composition as an antimicrobial agent against lactic acid bacteria and/or against molds, wherein the composition comprises as a first microbial agent xanthohumol having the formula (1),

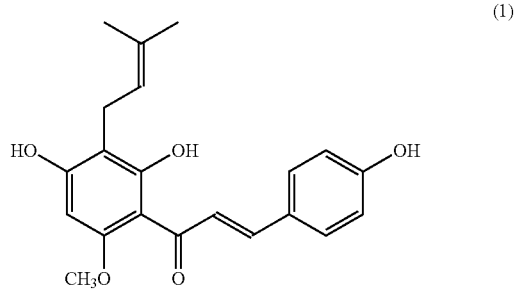

or a salt thereof and a second or further microbial agent.

The present inventors surprisingly found that compositions comprising xanthohumol are very effective against lactic acid bacteria and molds. Furthermore, since xanthohumol is derived from the flower cones of *Humulus lupulus* (commonly referred to as hop) it is considered a natural product. This is advantageous for reasons that consumers are becoming increasingly concerned with the use of non-natural ingredients in food. The inventors further found that in combination with other antimicrobial agents remarkably decreased growth of micro-organisms which cause food spoilage is obtained, in particular lactic acid bacteria and molds.

A second aspect of the present invention relates to an antimicrobial composition suitable for use in food products comprising:
  0.001 to 50% by weight xanthohumol, or a salt thereof, having the formula (1); and

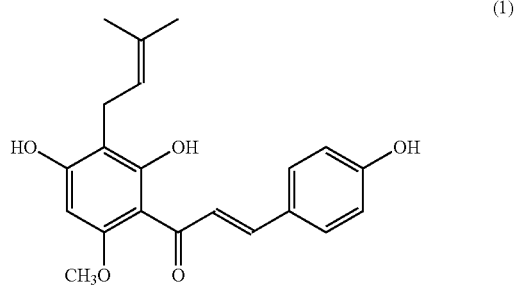

0.01 to 20% by weight of at least one additional antimicrobial agent.

It has further been found that it is advantageous to use xanthohumol in combination with other antimicrobial agents. The inventors have found that the use of xanthohumol in combination with other antimicrobial agents results in a remarkably decreased growth of micro-organisms which cause food spoilage, in particular lactic acid bacteria and molds.

A third aspect of the present invention relates to the use of said antimicrobial composition as an antimicrobial agent against lactic acid bacteria and/or molds in food products.

A fourth aspect of the present invention relates to a food product comprising said antimicrobial composition.

Definitions

The term "antimicrobial agent" or "antimicrobial" as used herein has its conventional meaning and refers to an agent that inhibits or prevents the growth of micro-organisms on or near a food product as well as which is able to kill micro-organisms on and/or near a food product.

The term "lactic acid bacteria" as used herein has its conventional meaning and refers to Gram positive bacteria, which produce lactic acid as the major metabolic end-product of carbohydrate fermentation. The major genus of the lactic acid bacteria are the *Lactobacillus*.

The term "mold" or "mould" as used herein are interchangeable and have their conventional meaning and refer to filamentous fungus.

The term "minimum inhibitory concentration", or "MIC" as used herein has its conventional meaning and may be expressed in e.g. % by weight or in mg/ml or in parts per million (ppm) and refers to the lowest concentration of an antimicrobial agent that inhibits or kills a micro-organism, assessed as the inhibition of the visible growth in vitro of a micro-organism after overnight incubation.

DETAILED DESCRIPTION OF THE INVENTION

Figure 1:
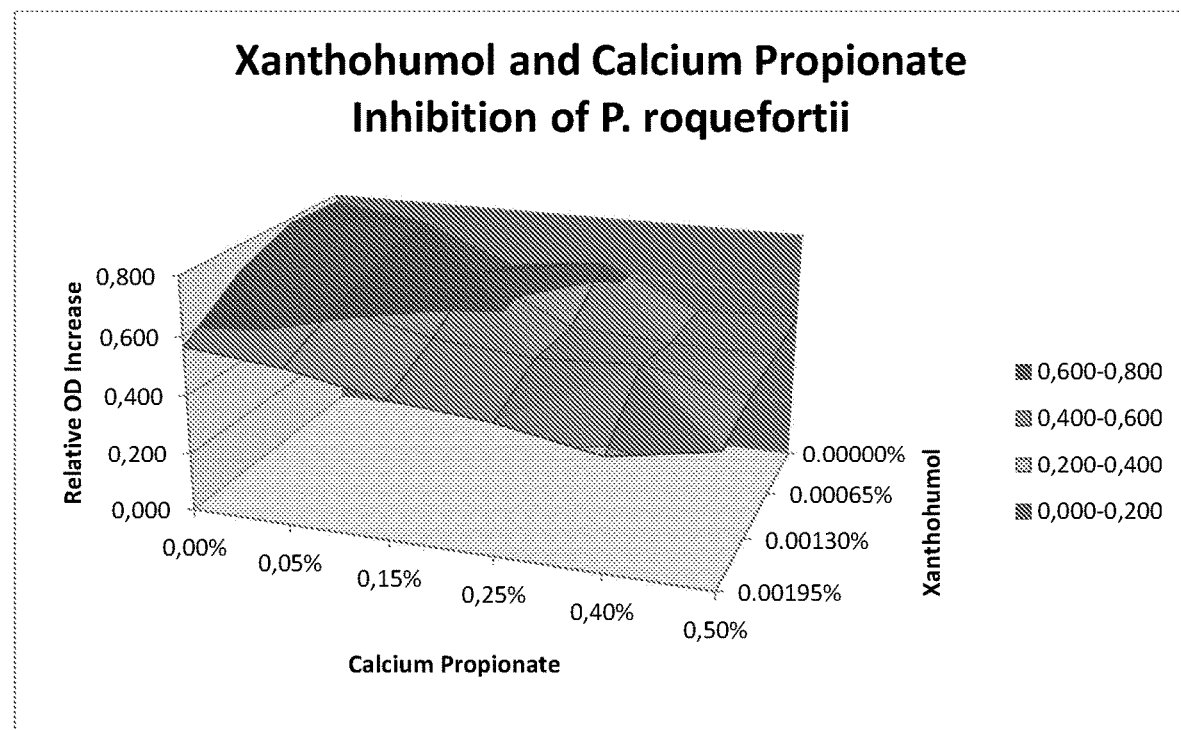
FIG. 1. Inhibition of *P. roquefortii* by calcium propionate and/or xanthohumol.

A first aspect of the present invention relates to the use of a composition as an antimicrobial agent against lactic acid bacteria and/or against molds, wherein the composition comprises as a first microbial agent xanthohumol having the formula (1),

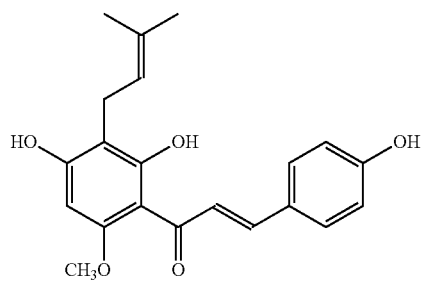

or a salt thereof and a second or further microbial agent. Preferably, the composition according to the present invention is used as an antimicrobial agent in food products.

The present inventors found that particularly good effects are obtained when the composition comprises xanthohumol or a salt thereof in combination with a second or further antimicrobial agent, preferably an antifungal agent, preferably an anti-mold agent and/or an anti-yeast agent and/or an agent active against LAB. Without wishing to be bound by any theory it is assumed that multiple attacks on the same spoilage microbe by means of different agents prevents the possibility of the microbe to recover from such an attack. It is particularly advantageous to use antimicrobial agents which use different biological mechanisms for attacking said microbes.

The second or further antimicrobial agent is preferably a *Propionibacterium*-fermented sugar composition comprising propionate, optionally together with other organic acids or salts thereof such as lactic acid, and acetic acid. The second or further antimicrobial agent may also be cinnamic acid or an edible salt thereof, such as potassium cinnamate. Also cedar oil or an organic acid such as propionic acid, lactic acid or acetic acid or a salt thereof, preferably calcium propionate may be used as a second or further antimicrobial agent. In this regard it is noted that also a combination of any of the above mentioned agents may be used in combination with the xanthohumol comprising agent.

Xanthohumol may be obtained from the resinous female inflorescences of *Humulus lupus* L. (Cannabaceae), which are often referred to as hop cones or strobiles and are primarily used in the brewing industry because of their bitter and aromatic properties. Xanthohumol is the most abundant prenylated flavonoid in fresh hops and may be derived there from by means of well known extraction techniques.

In the art the use of xanthohumol as an antibiofilm agent for prevention of the growth of bacteria in food processing equipment has been described. In this regard reference is made to the article of Rozalski et al., in *BioMed Research International*, 2013 pp. 1-7. However, it has now surprisingly been found that xanthohumol may not only be used as an antibiofilm agent against bacteria in food processing equipment, but that it may also be used in combination with other antimicrobial agents as an antimicrobial agent against lactic acid bacteria and molds.

It has specifically been found that xanthohumol may be used as an antimicrobial agent in food products, preferably in fresh meat, poultry, fish, cooked meat, ready-to-eat meals, sauces, pastry, bread, bakery products or in a liquid food.

Furthermore, since xanthohumol is derived from the flower cones of *Humulus lupulus* it is considered a natural product. This is advantageous for reasons that consumers are becoming increasingly concerned with the use of non-natural ingredients in food.

Although in some food products the growth of lactic acid bacteria is intentional, in many food products growth of lactic acid bacteria should be avoided because they give rise to off-flavors and/or limit the shelf life of food products. With the composition of the present invention it has now become possible to efficiently prevent or inhibit the growth of lactic acid bacteria without having to use non-natural antimicrobial agents.

The composition according to the present invention is preferably used as an antimicrobial agent against lactic acid bacteria which are commonly found in food products, such as *Lactobacillus adidophilus, Lactobacillus brevis, Lactobacillus curvatus, Lactobacillus plantarum, Lactobacillus farciminis, Lactobacillus sunkii, Lactobacillus fructivorans, Leuconostoc mesenteriodes*, preferably *Lactobacillus adidophilus, Lactobacillus brevis, Lactobacillus curvatus, Lactobacillus plantarum, Lactobacillus farciminis, Lactobacillus sunkii, Leuconostoc mesenteriodes*.

It has further been found that the xanthohumol comprising composition according to the present invention may also be used for inhibiting or preventing the growth of molds. As with lactic acid bacteria, there are some food products wherein the growth of molds is considered beneficial. However, in many food products the growth of molds should be prevented for reasons that they have a negative influence on the taste and appearance of said food product.

The composition according to the present invention is preferably used as an antimicrobial agent against molds from the genus *Aspergillus* or *Penicillium*. Preferably, the composition according to the present invention is used against the following molds or combinations thereof *Mucor plumbeus, Aspergillus flavus, Aspergillus niger, Paecilomyces variotii, Fusarium oxysporum, Rhizopus stolonifer, Penicillium roqueforti*. More preferably, the composition according to the present invention is used against the following molds or combinations thereof *Mucor plumbeus, Aspergillus flavus, Paecilomyces variotii, Fusarium oxysporum, Penicillium roqueforti*.

Flower cones of the *Humulus lupulus* (commonly referred to as 'hop') are a rich source of xanthohumol. Hop extracts comprising xanthohumol are commercially available, however their use as an antimicrobial agent against lactic acid bacteria and/or molds has not been reported before. Nor has it been reported before that xanthohumol extracts may be used as an antimicrobial agent against lactic acid bacteria and molds present in food products.

Hence, in one embodiment the invention relates to the use of the anti-microbial composition comprising xanthohumol according to the present invention, wherein the composition comprises an extract of *Humulus lupulus*, which extract comprises on a dry weight basis at least 5% by weight xanthohumol, preferably at least 50% by weight xanthohumol, most preferably at least 80% by weight xanthohumol.

The extract of *Humulus lupulus* used in the composition of the present invention is preferably a water extract, which has been prepared by first preparing an extract of *Humulus lupulus* by means of subjecting for example hop (the flower cones of *Humulus Lupulus*) to a supercritical carbon dioxide extraction method and/or an ethanol extraction method. These methods are commonly known in the art as has been described in the article of Rozalski et al., 2013 referred to above. In a further step the extract obtained with one or both of these methods is subjected to a water extraction at a temperature of 60° C. or higher. The water extract with therein the xanthohumol may be used directly as antimicrobial agent, however, it is also possible to concentrate or even dry said extract.

A typical commercially available extract of *Humulus lupulus* suitable for application in the various aspects of the invention is Xantho-Flav Extract on diatomaceous earth isolated from hops (Hopsteiner, Simon H. Steiner, Hopfen, GmbH, Mainburg, Germany).

The total amount of xanthohumol in the composition of the present invention preferably ranges between 0.001 to 50% by weight. More preferably the amount of xanthohumol in the composition of the present invention ranges between 0.005% and 20% by weight and most preferably between 0.01% and 10% by weight.

For most of the currently foreseeable practical applications of the antimicrobial composition comprising xanthohumol according to the invention, it is convenient to formulate said composition as a pourable formulation, for example in a formulation comprising a diluent, preferably water, ethanol, oil, propylene glycol, more preferably water, propylene glycol.

Furthermore, incorporating a diluent such as for example water and/or propylene glycol in the anti-microbial composition of the invention enables more convenient and accurate concentration adjustment of for example xanthohumol and optionally one or more further anti-microbial agents comprised in said composition.

Therefore, in an embodiment, the invention provides the use of the antimicrobial composition comprising xanthohumol, wherein the composition comprises at least 1% by weight of a diluent, preferably water, ethanol, oil, propylene glycol, more preferably water and/or propylene glycol.

The antimicrobial compositions according to the present invention are preferably used for extending the shelf-life of food, food products, preprocessed food and prepared food, commonly referred to as "food products".

Food products typically known for their susceptibility for contamination with lactic acid bacteria and/or contamination with molds are amongst others, fresh meat, poultry, fish, processed meat, cured meat, cooked meat, ready-to-eat meals, (cooking) sauces, deli salads, mayonnaise-based salads, cereal bars, (concentrated) gravy, pastry and liquid food, fruit juices, beverages without carbon dioxide, bakery products, cakes, dips, spreads, food fillings, food stuffings, and meal components. Preferably, antimicrobial compositions comprising xanthohumol according to the invention are thus used to preserve these food products and prevent them from spoilage.

Therefore, the antimicrobial composition according to the present invention is preferably used as an antimicrobial agent in food products, preferably in fresh meat, poultry, fish, cooked meat, ready-to-eat meals, sauces, pastry, bread, bakery products or in a liquid food.

Food products wherein the composition of the present invention is used as antimicrobial agent against lactic acid bacteria or molds preferably comprise 0.00010 to 0.05% by weight, preferably from 0.001 to 0.01% by weight xanthohumol or an edible salt thereof. It has been found that such concentrations of xanthohumol effectively inhibit or prevent the growth of lactic acid bacteria and/or molds.

In view of this, a second aspect of the present invention relates to an antimicrobial composition suitable for use in food products comprising:

0.001 to 50% by weight xanthohumol, or a salt thereof, having the formula (1); and

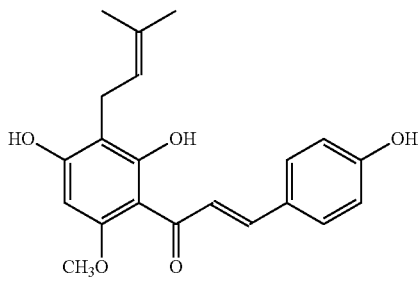

0.01 to 20% by weight of at least one additional antimicrobial agent.

Tests have shown that the efficacy of an antimicrobial treatment of a food product with xanthohumol improves when it is combined with a second or further anti-microbial agent. Without wishing to be bound by any theory it is assumed that multiple attacks on the same spoilage microbe by means of different agents prevents the possibility of the microbe to recover from such an attack. It is particularly advantageous to use antimicrobial agents which use different biological mechanisms for attacking said microbes.

In a preferred embodiment of the present invention the second or further antimicrobial agent is an antifungal agent, preferably an anti-mold agent or an anti-yeast agent and/or an agent active against LAB.

Another reason to combine xanthohumol with other antimicrobial agents is to avoid growth of different microorganisms in a specific food product by merely having to use one antimicrobial composition. For example, it is commonly known that food spoilage of certain products, such as fresh meat or bakery products is caused by different microorganisms. Hence, it is advantageous to use xanthohumol which is effective against lactic acid bacteria and/or molds in combination with other antimicrobial agents.

As described above, the present xanthohumol comprising composition is particularly suitable as an antimicrobial agent against molds from the genus *Aspergillus* or *Penicillium*, in particular the following molds *Mucor plumbeus, Aspergillus flavus, Aspergillus niger, Paecilomyces variotii, Fusarium oxysporum, Rhizopus stolonifer, Penicillium roqueforti*, more particularly against *Mucor plumbeus, Aspergillus flavus, Paecilomyces variotii, Fusarium oxysporum, Penicillium roqueforti*.

Furthermore, the present xanthohumol comprising composition is also particularly suitable as an antimicrobial agent against lactic acid bacteria, such as *Lactobacillus adidophilus, Lactobacillus brevis, Lactobacillus curvatus, Lactobacillus plantarum, Lactobacillus farciminis, Lactobacillus sunkii, Lactobacillus fructivorans, Leuconostoc mesenteriodes*.

Preferably, the additional antimicrobial agent is chosen from *Propionibacterium*-fermented sugar composition comprising propionate and acetate, cinnamic acid or a salt thereof, preferably potassium cinnamate, cedar oil or an organic acid, such as propionic acid, lactic acid or acetic acid or any salt thereof, preferably calcium propionate, or a combination of any of these agents.

With respect to cinnamic acid and salts thereof, e.g. potassium cinnamate ('Kcin'), it is noted that it is a natural product with antimicrobial activity. In the literature its use as the sole antimicrobial agent in antimicrobial compositions has been described. Hence, in accordance with the present invention it is advantageous to use xanthohumol in combination with cinnamic acid or salts thereof, in particular Kcin.

It has further been reported that a combination of Kcin with vanillin has already at a relatively low concentration a positive effect on the inhibition of the growth of molds. Hence, in an alternative embodiment the composition of the present invention comprises an effective amount of xanthohumol, vanillin and cinnamic acid or a salt thereof, such as Kcin.

Although the anti-microbial activity of various organic acids or salts thereof is known in the art, it has surprisingly been found that combining xanthohumol with organic acids, such as propionic acid, lactic acid and acetic acid, results in a remarkable inhibition of the growth of molds. Hence, the antimicrobial composition according to the present invention preferably comprises xanthohumol and one or more organic acids, preferably propionic acid or a salt thereof, such as calcium propionate.

It has further been found that combining xanthohumol with *Propionibacterium*-fermented sugar compositions has a remarkable inhibitory effect on the growth of lactic acid bacteria. The fermented sugar composition preferably comprises propionate and acetate.

*Propionibacterium*-fermented sugar compositions in general contain at least propionate and acetate. If a two-step fermentation approach is applied, (i.e. step 1) sugar to lactic acid, and step 2) lactic acid to propionic acid) and/or if lactic acid is added to the fermented product, lactate will be present as well in the fermented sugar composition. A preferred fermented sugar composition comprises 15 to 33% by weight propionate, 5 to 17% by weight acetate and 10 to 33% lactate. A particularly preferred fermented sugar composition comprises 15 to 20% by weight propionate, 5 to 10% by weight acetate and 10 to 20% lactate. Alternatively, the particularly preferred fermented sugar composition comprises 25 to 33% by weight propionate, 8 to 17% by weight acetate and 17 to 33% lactate, all on a dry weight basis. A commercially available product which is advantageous to use in the composition of the present invention is Verdad F95 which is marketed by Corbion, The Netherlands.

Hence, in a preferred embodiment of the composition of the present invention the composition comprises
  0.001 to 50% by weight xanthohumol; and
  0.01 to 20% by weight of a *Propionibacterium*-fermented sugar composition, which comprises 15 to 20% by weight propionate, 5 to 10% by weight acetate and 10 to 20% lactate.

Most preferably, the fermented sugar composition is Verdad F95.

It has further been found that combining xanthohumol and cedar oil has a remarkable strong and synergistic effect on the growth of various lactic acid bacteria.

The antimicrobial composition according to the present invention is preferably formulated as a pourable formulation, for example in a formulation comprising a diluent, preferably water, ethanol, oil, propylene glycol, more preferably water, propylene glycol. Furthermore, incorporating a diluent such as for example water and/or propylene glycol in the anti-microbial composition of the invention enables more convenient and accurate concentration adjustment of for example xanthohumol and optionally one or more further anti-microbial agents comprised in said composition.

In the antimicrobial composition according to the present invention xanthohumol as such may be used. However, it is also possible to use in the composition an extract of *Humulus lupulus*, which extract comprises xanthohumol. Depending on the amount of xanthohumol in said extract a relatively large amount or small amount of extract needs to be used to achieve the required xanthohumol content in the composition. In this regard it is also noted that it is also possible to use the extract as such.

In a preferred embodiment of the present invention a so called water extract of *Humulus lupulus*, is used as a source of xanthohumol. This water extract may be prepared as has already been described above with respect to the first aspect of the present invention.

In case an extract of *Humulus lupulus*, is used, the composition may be formulated in a dry form and may comprise diatomaceous earth as a carrier. In an embodiment of the composition of the present invention the composition comprises 60 to 99% by weight diatomaceous earth as a carrier. Before applying the composition to a food product said composition is incubated with a solvent, such as water to separate the xanthohumol and additional antimicrobial agent from the diatomaceous earth. Subsequently the liquid phase may be mixed with or applied to a food product.

In a particularly preferred embodiment, the antimicrobial composition according to the present invention comprises:
 0.001 to 50% by weight xanthohumol;
 0.01 to 20% by weight cedar oil or propionic acid or a salt thereof, preferably calcium propionate, or *Propionibacterium*-fermented sugar composition comprising propionate and acetate; and
 60 to 99% by weight diatomaceous earth.

In a further preferred embodiment, the antimicrobial composition according to the present invention comprises xanthohumol and lactide. Thus a particularly preferred embodiment of the invention is the antimicrobial composition according to the invention, wherein the composition comprises:
 0.001 to 50% by weight xanthohumol;
 0.01 to 20% by weight lactide, preferably 0.05 to 5% by weight, more preferably 0.1 to 0.5% by weight lactide.

The antimicrobial composition according to the present invention is preferably formulated as a liquid or as a powder. Most preferably, the composition is formulated as a liquid.

A third aspect of the present invention relates to the use of the above mentioned antimicrobial composition as an antimicrobial agent against lactic acid bacteria and/or molds and/or yeasts in food products.

Said antimicrobial composition is preferably used against molds from the genus *Aspergillus* or *Penicillium*, in particular the following molds *Mucor plumbeus, Aspergillus flavus, Aspergillus niger, Paecilomyces variotii, Fusarium oxysporum, Rhizopus stolonifer, Penicillium roqueforti*, more in particular the molds *Mucor plumbeus, Aspergillus flavus, Paecilomyces variotii, Fusarium oxysporum, Penicillium roqueforti*. The composition may also be used against the following lactic acid bacteria, *Lactobacillus adidophilus, Lactobacillus brevis, Lactobacillus curvatus, Lactobacillus plantarum, Lactobacillus farciminis, Lactobacillus sunkii, Lactobacillus fructivorans, Leuconostoc mesenteriodes*.

A fourth aspect relates to food products, which comprise said antimicrobial composition. Since xanthohumol is particularly effective against lactic acid bacteria or molds it is advantageous to use the composition in bread, bakery products, fresh meat, poultry, fish, cooked meat, ready-to-eat meals, sauces, pastry, dairy products or in a liquid food.

The present invention will be illustrated further by means of the following non-limiting Examples.

EXAMPLES

Example 1: Preparation of Xanthohumol for Use in Aspects of the Current Invention One part xanthohumol Xantho-Flav Extract (with 2% of xanthohumol) on diatomaceous earth is incubated with 9 parts of hot water at 100° C., boiling for <1 minute while vigorously shaking. After incubation, solid material is discarded. This way, a stock solution with 10% of Xanthoflav or about 0.2% xanthohumol (2 mg/ml) is obtained, which is used in the following examples.

Comparative Experiment 1

Antimicrobial Activity of Compositions Comprising Only Xanthohumol

For testing the anti-microbial activity a test composition comprising xanthohumol was applied. The test composition was prepared as follows. At the highest concentration 100 μl of the xanthohumol stock solution at 2 mg/ml in water (See Example 1) was added to 100 μl of 2 times concentrated MRS medium, providing a test composition comprising 1 mg/ml by weight xanthohumol in MRS medium.

Pre-cultures of test bacteria were cultured using standard techniques. Bacteria were cultured in MRS medium 48 hrs before the start of the experiments.

Five μl of the bacterium pre-cultures was brought in 200 μl of test medium (medium+component+water) and mixed with a concentration series of the test composition comprising xanthohumol. Final bacterium density at the start of the overnight experiment was $10^5$ cfu/ml. Xanthohumol was tested up to a concentration of 0.01 mg/ml (based on an addition level of up to 0.05% w/w of Xanthoflav). Negative control was inoculated broth, positive control was inoculated MRS medium. The test organisms are listed in Table 1, below. Bacterium cultures were cultured overnight at 30° C., under constant shaking. After incubation, the minimum inhibitory concentration for each test organism was scored (Table 1).

TABLE 1

Assessment of the minimum inhibitory concentration of a composition comprising xanthohumol on lactic acid bacteria

| Test organism | strain | Gram | MIC xanthohumol containing xanthoflav (% by weight) | MIC calculated to xanthohumol mg/ml |
|---|---|---|---|---|
| Lactobacillus acidophilus | DSM 20079 | + | 0.05 | 0.01 |
| Lactobacillus brevis | LMG 6906 | + | 0.01 | 0.002 |
| Lactobacilllus curvatus | Zand 2 | + | 0.05 | 0.01 |
| Lactobacilllus curvatus | AR095 | + | 0.05 | 0.01 |

TABLE 1-continued

Assessment of the minimum inhibitory concentration of
a composition comprising xanthohumol on lactic acid bacteria

| Test organism | strain | Gram | MIC xanthohumol containing xanthoflav (% by weight) | MIC calculated to xanthohumol mg/ml |
|---|---|---|---|---|
| Lactobacillus plantarum | AR052 | + | 0.01 | 0.002 |
| Lactobacillus plantarum | DSM 20174 | + | 0.02 | 0.004 |
| Lactobacillus farciminis | AR053 | + | 0.02 | 0.004 |
| Lactobacillus brevis | AR043 | + | 0.01 | 0.002 |
| Leuconostoc mesenteroides | AR049 | + | 0.01 | 0.002 |

The results show that the composition comprising xanthohumol is potent in inhibiting growth of various lactic acid bacteria.

Example 2: Anti-Microbial Efficiency of Compositions Comprising Xanthohumol And Verdad F95 in Inhibiting Various Lactic Acid Bacteria Different lactic acid bacteria were inoculated in MRS broth at pH=5.8 at a level of $10^5$ bacteria per ml. In the same manner, they were inoculated in broth containing 0.13% w/w of the working solution from example 1 (thus containing 0.013% of xanthoflav equivalent to 0.00026% xanthohumol). Also they were inoculated in broth containing 1.5% of Purac Verdad 95 (Corbion Purac, the Netherlands), a cultured sugar containing about 25% sodium propionate. They were also inoculated in broth containing 1.5% of Verdad F95 and 0.13% of the xanthohumol stock solution. After 72 hours of incubation at 30° C. the optical density at a wavelength of 595 nm was measured as a measure of the amount of cells grown in 72 hours.

TABLE 2

Effect of xanthohumol, Verdad F95 and the combination of these
agents on the growth of lactic acid bacteria by measuring OD595

|  |  | Control | Component 1 (verdad F95) | Component 2 (xanthoflav) | Component 1 and 2 |
|---|---|---|---|---|---|
| L. sunkii | AR935 | 1.57 | 1.63 | 0.25 | 0.17 |
| L. plantarum | AR057 | 1.7 | 1.7 | 0.25 | 0.20 |
| L. plantarum | DSM20 174 | 1.7 | 1.7 | 0.51 | 0.38 |

Example 3: Antimicrobial Efficiency of Compositions Comprising Xanthohumol and Propionate in Inhibiting Various Molds Five molds, *Penicillium roquefortii, Aspergillus flavus, Fusarium oxysporum, Paecilomyces variotii,* and *Mucor plumbeus*, were tested on the combinatory effect of xanthohumol combined with calcium propionate. In this example use has been made of a stock solution of 0.52% w/w XanthoFlav (equivalent to 0.0104% w/w xanthohumol) prepared in a similar manner as that described in example 1 above, as well as a stock solution of calcium propionate at 1.6% w/w. A modified semi-solid MEA agar was prepared by mixing 50 g of Malt Extract broth (Oxoid) with 7.5 g of Bacteriological Agar No. 1 (Oxoid) to create a 2x reduced agar MEA. This was autoclaved at 120° C. for 15 minutes. Bottles of this MEA were held at 50° C. until ready for inoculation, at which point they were inoculated with a single strain of the above listed molds at approximately $10^4$ spores per ml. This level of inoculation ensures 500-1000 spores per well in the 96 well plate. All media was set to pH 6.

The 2xMEA was mixed with the stock solutions of xanthohumol, calcium propionate, and sterilized $H_2O$ as a diluent in 96 well plates using an automated plate filler to create a concentration gradient of calcium propionate ranging from 0% to 0.5% along one axis and xanthohumol from 0% to 0.00195% along the other axis. Wells containing 0% of both antimicrobials served as a control. This allowed for testing approximately 24 different combinations of the two antimicrobials on one plate. Each well contained 75 µL of inoculated 2x reduced agar MEA, 75 µL of a mix of antimicrobials/diluent, and was capped with 75 µL of paraffin oil after the agar had set. Ninety-six well plates were then sealed with an oxygen permeable membrane to prevent contamination of wells.

OD measurements were taken approximately once a day, and outgrowth (measured by an increase in OD) was tracked over time. Measurements at the final reading (day 13) were placed in a 3D graph to visualize the additive effects of the two antimicrobials as levels of each increased across the plate.

Figure 2:
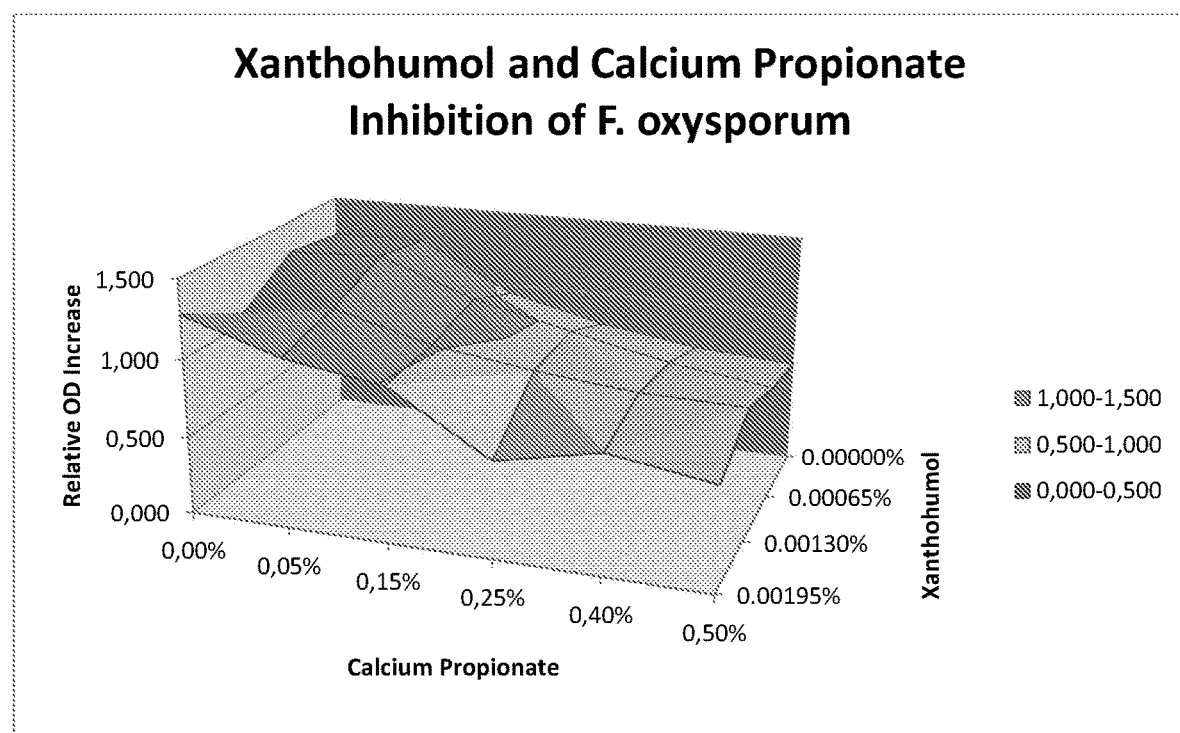
FIG. 2. Inhibition of *F. oxysporum* by calcium propionate and/or xanthohumol.
Figure 3:
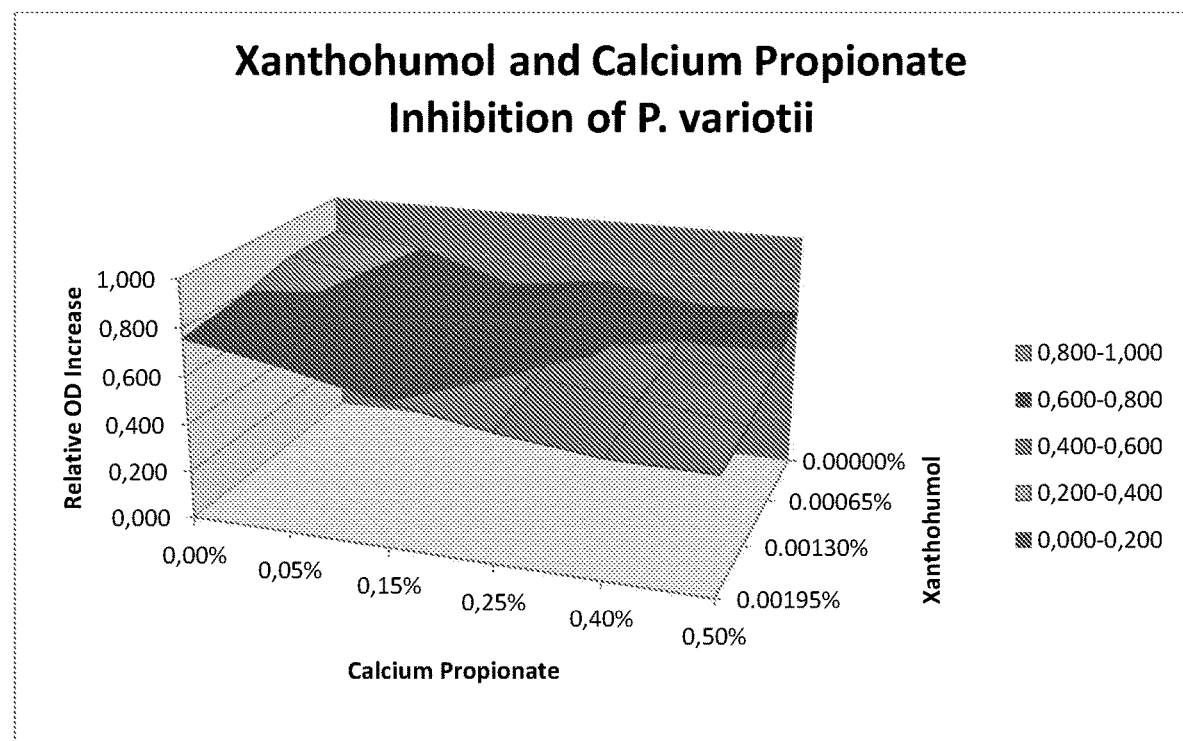
FIG. 3. Inhibition of *P. variotii* by calcium propionate and/or xanthohumol.
Figure 4:
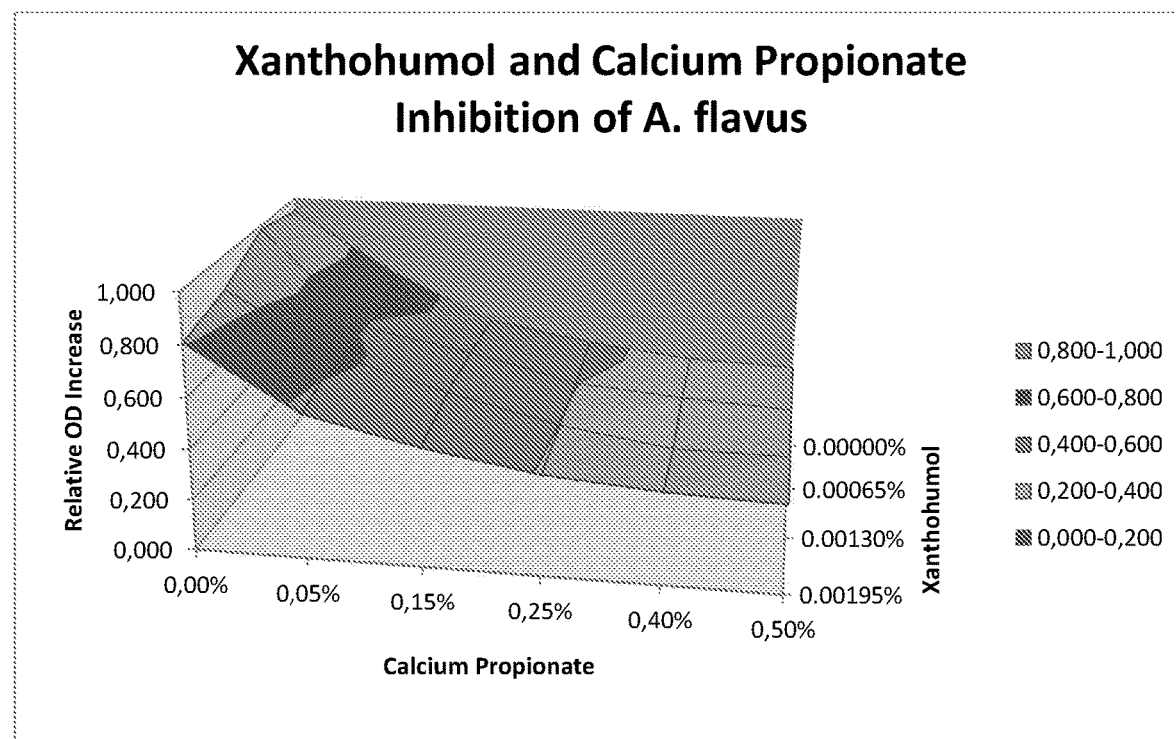
FIG. 4. Inhibition of *A. flavus* by calcium propionate and/or xanthohumol.
Figure 5:
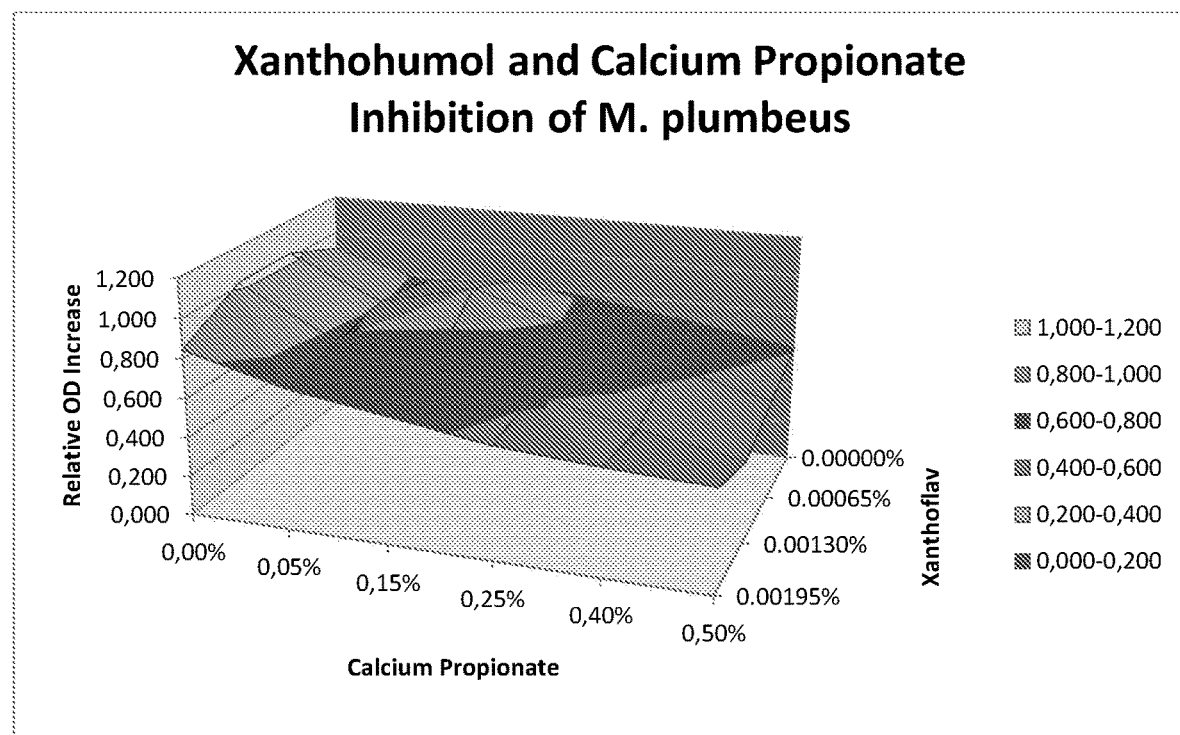
FIG. 5. Inhibition of *M plumbeus* by calcium propionate and/or xanthohumol.

Results are visualized in the graphs of FIGS. 1-5. It is seen that xanthohumol has an inhibiting effect by itself already, and that the combination of calcium propionate and xanthohumol leads to an inhibition level that cannot be readily achieved with the individual components.

Example 4: Anti-Microbial Efficiency of Compositions Comprising Xanthohumol and Propionate In Inhibiting Various Molds Two molds, *Aspergillus Niger* and *Penicillium roquefortii* were tested on the combinatory effect of xanthohumol in combination with propionate. MEA broth was inoculated with spores of the fungi to a concentration of $10^4$ spores per ml. In this example use has been made of the stock solution of xanthohumol as has been described in example 1 above. 4 ml of said stock solution was added to 96 ml of broth to obtain a 0.008% w/w solution in broth.

Propionate was added to an end concentration of 0.085% of propionate in broth. Also a solution was made with 0.008% w/w of xanthohumol and 0.085% of propionate in broth. As a control experiment broth without antimicrobial components was used. The pH of all media was set to 3.5. After 14 days of incubation at 25° C., the broth was inspected for visible growth of mould hyphae. Results of these tests are depicted in Table 3.

TABLE 3

Effect of xanthohumol, propionate and the combination of these agents on the growth of molds

|  | Control | xanthohumol (0.008 wt %) | propionate (0.085 wt %) | xanthohumol and propionate (0.008 wt %; 0.085 wt % respectively) |
|---|---|---|---|---|
| Aspergillus Niger | Growth | Growth | Growth | No growth |
| Penicillium roquefortii | Growth | Growth | Growth | No growth |

Comparative Experiment 2: Anti-Microbial Effect of a Composition Comprising Xanthohumol in Food Products Contaminated with *Lactobacillus*

In this example, the influence of xanthohumol on growth of *Lactobacillus plantarum* in baby food and in pasta sauce was assessed. For this purpose the baby food was sterilized and the pH was adjusted at pH 4.8, and the pasta sauce was sterilized and the pH was adjusted to pH 4.2.

At time-point t=0, three samples of both the baby food and the pasta sauce were inoculated with a *Lactobacillus plantarum* starter culture, at a final *Lactobacillus* cell density of approximately $1*10^4$ cells/ml. For the baby food and the pasta sauce, one sample each was inoculated in the presence of 0.2% by weight xanthohumol composition to a final concentration of xanthohumol in the food product of 0.004 mg/ml. *Lactobacillus plantarum* cell density was determined in the food products at t=0 and at t=24 hours. The results of the xanthohumol on *Lactobacillus plantarum* growth are provided in Table 4.

From Table 4 it is clear that the use of xanthohumol has a strong inhibitory effect on *Lactobacillus plantarum* in baby food and pasta sauce.

TABLE 4

Effect of xanthohumol on growth of *Lactobacillus plantarum* in food products

| time | Baby food control | Baby food + xanthohumol | Pasta sauce control | Pasta sauce + xanthohumol |
|---|---|---|---|---|
| 0 h | $4.8 \times 10^4$ | $3.8 \times 10^4$ | $3.8 \times 10^4$ | $3 \times 10^4$ |
| 24 h | $3 \times 10^7$ | $3 \times 10^4$ | $6 \times 10^5$ | <100 |

Example 5: Shelf Life Extension of Sausages

In Example 7, the influence on shelf life extension of sausages of Xanthoflav alone, or of Xanthoflav combined with either 'ACE 50', or Lactide, or both, was analyzed. Ace 50 is Opti.form powder Ace S50, which is commercially available from Corbion Purac (The Netherlands). It is a powder comprising 49.5% sodium lactate and 49.5% sodium acetate. Lactide (CAS 4511-42-6 and 95-96-5, PURALACT from Corbion Purac (The Netherlands)) is the dimeric, cyclic ester of lactic acid which exists as three optical isomers: L-lactide formed from two L-lactic acid molecules; D-lactide formed from two D-lactic acid molecules; and, meso-lactide formed from L-lactic acid and D-lactic acid.

Preparation

Sausages were produced according to the following procedure. The ingredients defined as weight percentages in Table 5 were used for the preparation of the sausage. Xanthoflav was used as such, without a preparation step such as applied in Example 1.

First the meat was shredded, and salt, tri polyphosphate and half of the water was added. After mixing very well, the other ingredients were added. The meat dough was put in a cook crimp bag and vacuum sealed. After sealing the bags were canned. The sausages were cooked in a cooking cabinet for 120 minutes at 75° C. and afterwards cooled down to 15° C. The final sausages were stored at 0° C.

It was observed that no moisture loss from the sausages has taken place during cooking. The pH of the sausages was 6.6, unless lactide had been added (for experiment 'Ingredients: Nr. 3, Nr. 6, Nr. 7'; see Table 5). For experiments in which lactide was included, the pH was 5.3-5.5 due to an at least partial degradation of the lactide into lactic acid.

TABLE 5

Ingredients of sausages prepared with xanthohumol and other preservative agents

| Ingredients | Nr 1: Control | Nr 2: 1% Ace 50 | Nr 3: 0.8% Lactide | Nr 4: 0.2% Xanthoflav | Nr 5: 1% ACE 50 + 0.2% Xanthoflav | Nr 6: 0.2% Xanthoflav + 0.8% Lactide | Nr 7: 1% ACE 50 + 0.2% Xanthoflav + 0.8% |
|---|---|---|---|---|---|---|---|
| Water | 19.62 | 18.62 | 18.82 | 19.42 | 18.42 | 18.62 | 17.62 |
| Salt | 1.67 | 1.67 | 1.67 | 1.67 | 1.67 | 1.67 | 1.67 |
| Sodium nitrite | 0.01 | 0.01 | 0.01 | 0.01 | 0.01 | 0.01 | 0.01 |
| Isolated Soy Protein | 1.50 | 1.50 | 1.50 | 1.50 | 1.50 | 1.50 | 1.50 |
| Sodium-tri- | 0.33 | 0.33 | 0.33 | 0.33 | 0.33 | 0.33 | 0.33 |

TABLE 5-continued

Ingredients of sausages prepared with xanthohumol and other preservative agents

| Ingredients | Nr 1: Control | Nr 2: 1% Ace 50 | Nr 3: 0.8% Lactide | Nr 4: 0.2% Xanthoflav | Nr 5: 1% ACE 50 + 0.2% Xanthoflav | Nr 6: 0.2% Xanthoflav + 0.8% Lactide | Nr 7: 1% ACE 50 + 0.2% Xanthoflav + 0.8% |
|---|---|---|---|---|---|---|---|
| Sodium Erythorbate | 0.03 | 0.03 | 0.03 | 0.03 | 0.03 | 0.03 | 0.03 |
| Sugar | 2.05 | 2.05 | 2.05 | 2.05 | 2.05 | 2.05 | 2.05 |
| Tapioca Starch | 3.50 | 3.50 | 3.50 | 3.50 | 3.50 | 3.50 | 3.50 |
| Xanthoflav (as is) | | | | 0.20 | 0.20 | 0.20 | 0.20 |
| Opti.Form Powder Ace S50 | | 1.00 | | | 1.00 | | 1.00 |
| Lactide | | | 0.80 | | | 0.80 | 0.80 |
| Chicken meat with skin | 50.92 | 50.92 | 50.92 | 50.92 | 50.92 | 50.92 | 50.92 |
| Pork belly | 20.37 | 20.37 | 20.37 | 20.37 | 20.37 | 20.37 | 20.37 |

Evaluation of Microbiological Resistance

In a first step an inoculum was prepared as follows. Cultures of lactic acid bacteria (*L. curvatus*, 3×*L. plantarum* and *L. mesenteroides*) are started from plate and incubated overnight at 30° C. in screw-capped tubes (100×16 mm) containing 10 ml MRS broth.

Sausages were inoculated to a final level of about 1000 ($10^3$) CFU per g product. The sausage was inoculated with 1% Inoculum (approximately 5 ml Inoculum per 500 gram ground meat). The ground sausage was weighed into bag filters, vacuum sealed (Turbovac, vacuum time: 6, gas time: G, seal time: 2) and stored at 7° C.

At appropriate time intervals, samples of inoculated ground sausage of each batch are taken in triplicate for microbiological analyses. A bag filter with the sample was opened and 3 times diluted with sterile dilution fluid (8.5% (w/w) NaCl and 0.1% (w/v) bacteriological peptone). The mix was homogenized for 1 min. in a Stomacher. Additional dilutions were made in sterile dilution fluid as well.

Fifty μl of the homogenate or dilution was subsequently plated on MRS agar using an Eddyjet type 1.23 spiral plater (IUL Instruments, Barcelona, Spain). Plates were incubated for 48 hours at 30° C. or 72 hours at room temperature. The colonies were counted with the Acolyte Supercount automatic colony counter (Synoptics, Cambridge, UK) using the Synoptics software package.

The results of the test are given in Table 6 as the number of days until the plate count number reached a logarithmic value of 7.

Table 6 shows that the variants with respectively 1% ACE 50 (Nr 2), 0.8% Lactide (Nr 3), 0.2% Xanthoflav (Nr 4) or 1% ACE 50+0.2% Xanthoflav (Nr 5) had a shelf life that was improved with about 4 days as compared to the control. With 0.2% Xanthoflav+0.8% Lactide (Nr 6), the shelf life was improved more, with about 14 days as compared to the control. The variant with 1% ACE 50+0.2% Xanthoflav+ 0.8% Lactide (Nr 7) performed the best with a shelf life increase of more than 19 days as compared to the control.

TABLE 6

Shelf life of sausages

| | Days till $10^7$ cfu/g |
|---|---|
| Nr 1: Control | 8.0 |
| Nr 2: 1% Ace 50 | 12.0 |
| Nr 3: 0.8% Lactide | 12.5 |
| Nr 4: 0.2% Xanthoflav | 11.5 |
| Nr 5: 1% ACE 50 + 0.2% Xanthoflav | 12.5 |
| Nr 6: 0.2% Xanthoflav + 0.8% Lactide | 22.0 |
| Nr 7: 1% ACE 50 + 0.2% Xanthoflav + 0.8% Lactide | >27 |

The invention claimed is:

1. A method of preventing or inhibiting growth of lactic acid bacteria and/or mold, comprising incorporating a composition comprising
   (a) a first microbial agent xanthohumol having the formula (1)

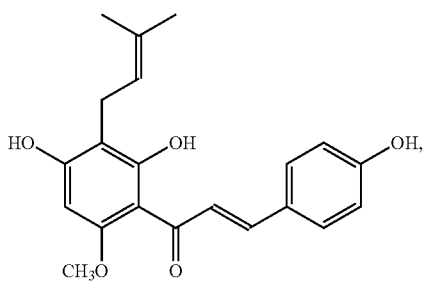

(1)

or a salt thereof, and
   (b) a second microbial agent selected from the group consisting of a *Propionibacterium*-fermented sugar composition comprising propionate and acetate; cinnamic acid or a salt thereof; potassium cinnamate; cedar oil; lactide; ACE 50 (49.5% sodium lactate/ 49.5% sodium acetate powder); or a combination thereof.

2. The method according to claim 1, wherein the *Propionibacterium*-fermented sugar composition comprising propionate and acetate is Verdad F95 (cultured sugar containing about 25% sodium propionate).

3. The method according to claim 1, wherein the bacteria are *Lactobacillus adidophilus, Lactobacillus brevis, Lactobacillus curvatus, Lactobacillus plantarum, Lactobacillus farciminis, Lactobacillus sunkii, Lactobacillus fructivorans, Leuconostoc mesenteriodes* or a combination thereof.

4. The method according to claim 1, wherein the mold are *Mucor plumbeus, Aspergillus flavus, Aspergillus niger, Paecilomyces variotii, Fusarium oxysporum, Rhizopus stolonifer, Penicillium roqueforti* or a combination thereof.

5. The method according to claim 1, wherein the composition comprises an extract of *Humulus lupulus*, which extract comprises on a dry weight basis at least 2% by weight xanthohumol.

6. The method according to claim 5, wherein the extract of *Humulus lupulus* is obtained by:
   (a) preparing an extract of *Humulus lupulus* by means of a supercritical carbon dioxide extraction method and/or an ethanol extraction method; and
   (b) subjecting the extract obtained to a water extraction at 60° C. or higher to render a water extract of *Humulus lupulus*.

7. The method according to claim 1, wherein the composition comprises at least 1% by weight of a diluent.

8. The method according to claim 7, wherein the diluent is selected from the group consisting of water, ethanol, oil, and propylene glycol.

9. The method according to claim 1, wherein the composition is incorporated into food products.

10. The method according to claim 9, wherein the food product comprises from 0.00010 to 0.05% by weight of xanthohumol or an edible salt thereof.

11. An antimicrobial composition, comprising:
    (a) 0.001 to 50% by weight xanthohumol, or a salt thereof, having the formula (1)

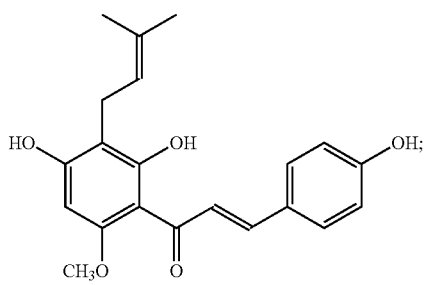

(1)

and
    (b) 0.01 to 20% by weight of at least one additional antimicrobial agent selected from the group consisting of a *Propionibacterium*-fermented sugar composition comprising propionate and acetate; cinnamic acid or a salt thereof; potassium cinnamate; cedar oil; lactide; ACE 50 (49.5% sodium lactate and 49.5% sodium acetate powder); or a combination thereof.

12. The antimicrobial composition according to claim 10, further comprising (c) 60 to 99% by weight diatomaceous earth as carrier.

13. The antimicrobial composition according to claim 11, wherein the composition comprises:
    (a) 0.001 to 50% by weight xanthohumol;
    (b) 0.01 to 20% by weight cedar oil; and
    (c) 60 to 99% by weight diatomaceous earth.

14. The antimicrobial composition according to claim 11, wherein the composition comprises:
    (a) 0.001 to 50% by weight xanthohumol; and
    (b) 0.01 to 20% by weight lactide.

15. The antimicrobial composition according to claim 11, wherein the composition comprises an extract of *Humulus lupulus*.

16. The antimicrobial composition according to claim 15, wherein the extract of *Humulus lupulus* is a water extract obtainable by the method comprising:
    a) preparing an extract of *Humulus lupulus* by means of a supercritical carbon dioxide extraction method and/or an ethanol extraction method; and
    b) subjecting the extract obtained to a water extraction at 60° C. or higher to render a water extract of *Humulus lupulus*.

17. The antimicrobial composition according to claim 11, wherein the composition is formulated as a liquid or a powder.

18. A food product comprising an antimicrobial composition according to claim 11.

19. The food product according to claim 18, wherein the product is bread, bakery products, fresh meat, poultry, fish, cooked meat, ready-to-eat meals, sauces, pastry or a liquid food.

\* \* \* \* \*